United States Patent
Vetter et al.

(10) Patent No.: US 7,998,429 B2
(45) Date of Patent: Aug. 16, 2011

(54) CATALYST CONTAINMENT DESIGN FOR RADIAL FLOW REACTORS

(75) Inventors: Michael J. Vetter, Des Plaines, IL (US); Paul A. Sechrist, Des Plaines, IL (US); Bing Sun, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 497 days.

(21) Appl. No.: 11/949,015

(22) Filed: Nov. 30, 2007

(65) Prior Publication Data
US 2009/0142240 A1 Jun. 4, 2009

(51) Int. Cl.
*B01J 8/12* (2006.01)

(52) U.S. Cl. ........ 422/216; 422/220; 422/221; 422/239; 422/311

(58) Field of Classification Search .......... 422/216, 422/220, 221, 239, 311
See application file for complete search history.

(56) References Cited

U.S. PATENT DOCUMENTS

| | | | |
|---|---|---|---|
| 2,636,805 A * | 4/1953 | Lassiat et al. ............ | 208/168 |
| 2,661,322 A * | 12/1953 | Evans ..................... | 208/168 |
| 4,017,278 A | 4/1977 | Reese .................... | 55/96 |
| 4,126,435 A | 11/1978 | Reese .................... | 55/474 |
| 4,225,562 A | 9/1980 | Anderson ............... | 422/188 |
| 4,478,793 A | 10/1984 | Vickers .................. | 422/216 |
| 5,130,106 A | 7/1992 | Koves et al. ........... | 422/216 |
| 5,209,908 A | 5/1993 | Koves et al. ........... | 422/218 |
| 5,366,704 A | 11/1994 | Koves et al. ........... | 422/218 |
| 5,389,235 A | 2/1995 | Russ et al. .............. | 208/134 |
| 6,224,838 B1 | 5/2001 | Schulz et al. ........... | 422/218 |
| 6,569,389 B1 | 5/2003 | Koves et al. ........... | 422/219 |

FOREIGN PATENT DOCUMENTS

JP 52082676 A * 7/1977

OTHER PUBLICATIONS

U.S. Appl. No. 11/851,727, filed Sep. 7, 2007, Vetter et al.

* cited by examiner

*Primary Examiner* — Jennifer A Leung
(74) *Attorney, Agent, or Firm* — Mark Goldberg

(57) ABSTRACT

An apparatus is presented for contacting a bed of particulate material with a cross flowing fluid, which maintains the bed of particulate material within a retention volume. The apparatus includes partitions for retaining particles, with openings disposed within the partitions. The openings are covered by louvers that extend above the edges of the openings to prevent solid particles from spilling through inlet openings, and the design prevents the loss of particles through the openings during cooldown of the apparatus.

10 Claims, 1 Drawing Sheet

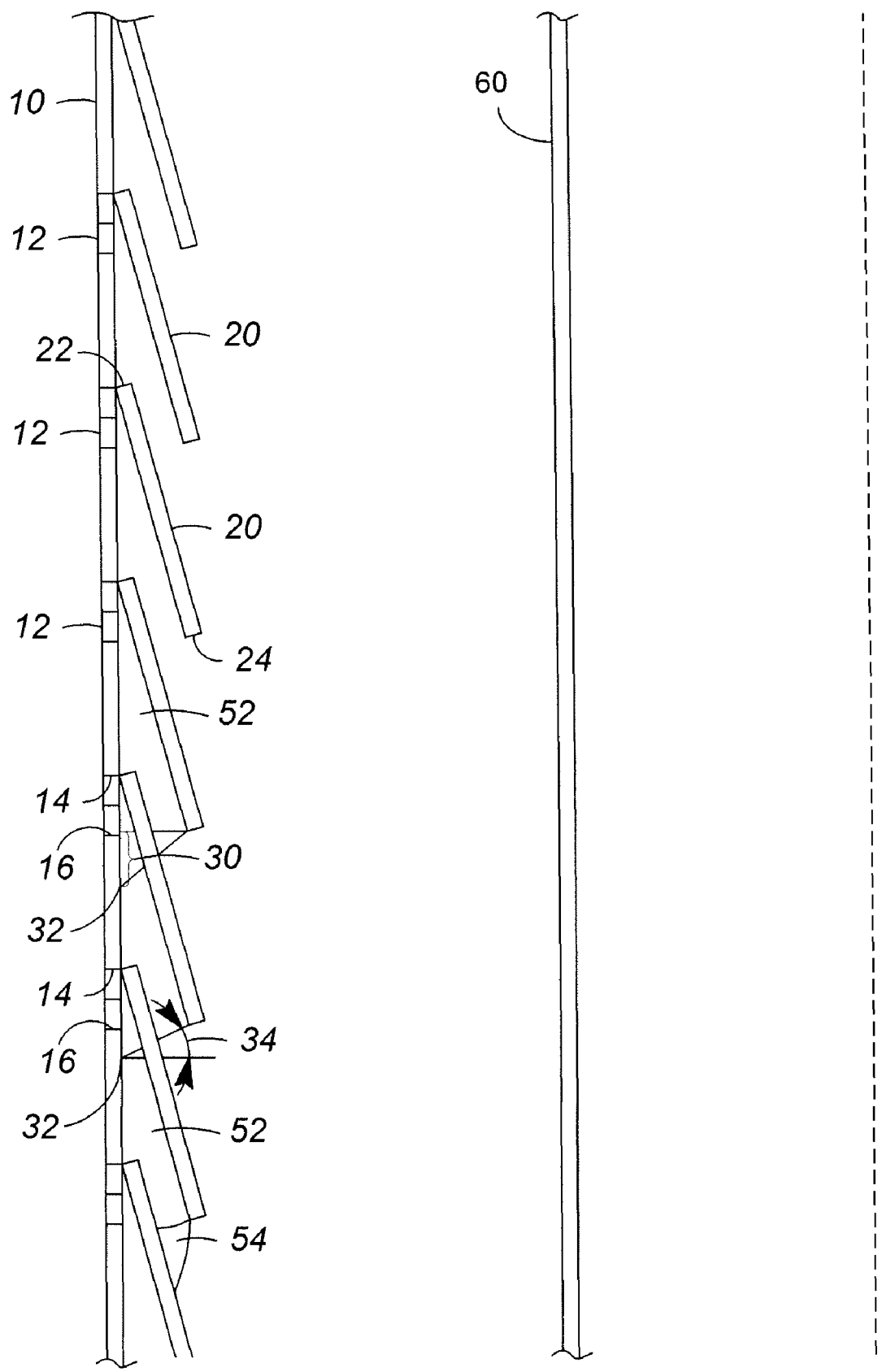

US 7,998,429 B2

CATALYST CONTAINMENT DESIGN FOR RADIAL FLOW REACTORS

BACKGROUND OF THE INVENTION

This invention relates to the field of fluid particle contact and to an apparatus for contacting fluids and particles. More specifically, this invention relates to a containment system for a moving bed of particles with a cross-flowing fluid.

A wide variety of processes use cross flow reactors to provide for contact between a fluid and a solid. The solid usually comprises a catalytic material on which the fluid reacts to form a product. The processes cover a range of processes, including hydrocarbon conversion, gas treatment, and adsorption for separation.

Cross flow reactors are often radial flow reactors and are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes are used to hold the catalyst particles within a bed and are sized to have openings sufficiently small that the particles cannot pass through. The openings may be elongated slots having a sufficiently narrow spacing such that the particles cannot pass through the slots. A significant problem is the corrosion of meshes or screens used to hold catalyst beds in place, or for the distribution of reactants through a reactor bed. Corrosion can plug openings to a screen or mesh, creating dead volumes where fluid does not flow. Corrosion and erosion can also create larger openings where the catalyst particles can then flow out of the catalyst bed with the fluid and be lost to the process increasing costs. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

SUMMARY OF THE INVENTION

The present invention provides for an apparatus for containing a particulate solid material within a cross flow reactor. The apparatus includes a perforated plate having openings defined therein, where the openings have an upper edge and a lower edge. Each opening is covered by a louver, where the louvers each have a first edge and a second edge. The first edge is the leading edge and the second edge is the trailing edge, where the direction corresponds to the direction of flow of solid particles through the apparatus, and where the trailing edge is downstream relative to the leading edge with respect to the flow of the solid particles. The leading edge of the louver is affixed to the perforated plate at a position above the upper edge of the opening covered by the louver, and the trailing edge extends to a distance below the lower edge of the opening equal or greater than the maximum thermal contraction length of the reactor less the vertical distance from the trailing edge of the louver to the granular solid angle repose base.

In one embodiment, the louvers extend away from the partition at an angle between 10 and 20 degrees.

Other objects, advantages and applications of the present invention will become apparent to those skilled in the art from the following detailed description and drawings.

BRIEF DESCRIPTION OF THE DRAWING

FIGURE is a diagram of a cross section of a reactor wall with louvers covering openings.

DETAILED DESCRIPTION OF THE INVENTION

A problem exists with radial flow reactors where a catalyst flows down an annular region, and the annular region is defined by an inner screened partition and an outer screened partition, which defines the catalyst bed, or a particle retention volume for holding a granular solid. A fluid, usually a gas, flows across the partitions and catalyst bed, reacting with the catalyst to produce a product fluid, also usually a gas. The reactor holds the catalyst in with screens where the gas flows through. The screens need holes, or slots, sufficiently small, or narrow, to prevent catalyst particles from passing, but the holes are subject to plugging and creating dead spaces where the gas doesn't flow, as well as the screens are subject to erosion and corrosion, creating larger holes that allow for catalyst to spill out.

The apparatus can also be an adsorber for adsorbing a constituent from the fluid flowing over a granular solid adsorbent. This includes an apparatus where the adsorbent is loaded and does not flow through the adsorber, but is held in place by the inlet and outlet partitions while fluid flows over the granular adsorbent. The apparatus of the present invention is oriented for the downward, or in the direction of gravity, flow of a solid through the apparatus with the cross flow of a gas, and accordingly, the use of the terms downward and upward are in reference to directions relative to the direction of gravity.

A new design for a screenless reactor, using louvers, provides the ability to contain the catalyst while allowing cross flow of a fluid and in addition reducing or eliminating fouling or plugging in the reactor. This louver design has a free surface of catalyst that allows for vapor flow to enter a catalyst bed and contact the catalyst, and a large open area that mitigates plugging or fouling issues associated with screens.

One of the issues of the screenless reactor is the migration of catalyst particles up under the louvers. A reactor containing the catalyst will go through start-up and shut-down cycles, during which the reactor and the catalyst heat up and cool down. For example, upon shutdown of a unit with the catalyst bed and louvered containment system, the system cools down and the thermally expanded louver contracts with a reduction in overall length. The contraction causes the catalyst bed free surface to move upwards underneath the louver, with the potential for flow of catalyst out of the openings of a perforated plate supporting the louvers.

Experimentation revealed that the displacement of catalyst under the louvers in the present invention was stronger function of the extrusion mechanism rather than a volume displacement mechanism. This leads to improved design control for determining louver extension below the bottom of the openings.

An embodiment of the present invention is an apparatus for containing a granular solid in a cross flow system. A granular solid flows with gravity down through a reactor volume which is defined by a containment space between an inlet partition and an outlet partition. The solid can be a catalyst or an adsorbent, and the apparatus can be a reactor or an adsorber. For purposes of the description, a reactor will be described, but an adsorber can fall within the bounds of the invention. A fluid flows across the reactor volume where components in the fluid react generating an effluent where the effluent exits through the outlet partition. The partitions, inlet and outlet, are perforated plates having openings defined therein. In one embodiment, the apparatus retains a screened outlet partition, and the inlet partition comprises a perforated plate having openings defined therein, where the openings have an upper edge and a lower edge. The inlet partition is an exterior reactor wall. The apparatus further includes a plurality of louvers, where each louver has a first edge and a second edge. The first edge is a leading edge and the second edge is a trailing edge, where the leading edge is upstream of the trailing edge with respect to the flow of granular solid through the apparatus. The louvers are affixed to the perforated plate with the leading edge of a louver affixed at a position above the upper edge of one or more openings covered by the louver. The louver's trailing edge extends downward beyond the lower edge of openings covered by the louver to a distance greater than the maximum thermal growth length of the granular solid less the distance to the granular solid angle of repose base.

A diagram of a louver over an opening is shown in the FIGURE. A portion of the perforated plate 10 has an opening 12 defined therein, where the opening has an upper edge 14 and a lower edge 16. A louver 20 having a leading edge 22 and a trailing edge 24 is affixed to the perforated plate 10 at a position above the upper edge 14 of the opening 12. The louver 20 extends downward and away from the plate 10 where the trailing edge 24 extends below the lower edge 16 of the opening 12 by a distance greater than or equal to the maximum thermal contraction length of the reactor less the distance 30 to the granular solid angle of repose base 32.

The angle of repose is a property of granular solids, and is the maximum angle of a stable slope determined by properties of the solid, such as friction, cohesion and shape of the solid particles. When solid granular materials are poured onto a horizontal surface, a pile will form and an angle between the surface of the pile and the horizontal surface is the angle of repose 34. This provides a vertical distance between the repose base 32 and the trailing edge 24 of the louver 20.

The louver 20 extends away from the perforated plate at an angle 40 between 10 degrees and 40 degrees from vertical. Preferable the angle 40 is between 10 degrees and 20 degrees from vertical, and more preferably the angle 40 is between 10 degrees and 15 degrees from vertical.

In one embodiment, the perforated plate 10 is an exterior wall for inlet flows for a radial flow reactor and the louvers 20 on the interior of the exterior wall and circumscribe the inside of the exterior wall 10. The exterior wall 10 is a substantially cylindrical structure, and the louvers 20 form frustoconical structures affixed to the inside of the exterior wall 10. The volume underneath the louvers 20 is a space into which solid catalyst particles can move during a cool down of the reactor. To insure that the catalyst does not rise to the level of the openings 12 in the exterior wall 10, the louvers 20 are sized to have the trailing edge 24 extend at least 1.22 cm per meter of reactor height (0.15 inches/foot of reactor height) below the lower edge 16 of the opening 12. Preferably, the louvers 20 are sized such that the trailing edge 24 extends to at least 1.3 cm per meter of reactor height (0.16 inches/foot of reactor height) below the lower edge 16 of the opening 12.

Since the construction of a perforated plate 10 having openings 12 disposed within the perforated plate 10 is complex, the fabrication for different sized louvers and affixing the different sized louvers to the perforated plate 10 can be costly. An appropriate modification is to determine the maximum size louver 20 and to size all of the louvers 20 accordingly. This means the topmost louver 20 will be pulled down the most into the reactor bed during a cooldown phase. For a typical reactor at 650° C. (1200° F.), with a height of approximately 12.2 meters (40 feet) and the expected contraction is approximately 15 cm (5.9 inches), therefore the trailing edge 25 of the louver 20 should extend at least 15 cm below the lower edge 16 of the opening 12.

Experiments were performed to study the extrusion of granular solids underneath louvers and through the perforations, as the apparatus and solid under went thermal cycles. The heating and cooling cycles were simulated through the use of an experimental design and not actually heated and cooled. The simulation involved forcing a relative contraction of the reactor height by forcing the bottom of the experimental apparatus to push the particles upward in the apparatus and against a louvered centerpipe 60 having a louvered construction like that of the perforated plate 10.

The simulated heating and cooling of an experimental apparatus was performed. The apparatus comprised a perforated inner pipewall having circumferential louvers disposed around the outside surface of the pipewall. The louvers covered openings within the pipewall. The louvers were affixed at an angle of 36.5 degrees from the pipewall. The pipewall was disposed within an outer cylindrical container. The apparatus included a bottom plate affixed to the outer cylindrical container. The apparatus was designed for the relative motion of the outer container to the inner pipewall. The apparatus was filled with 0.16 cm (1/16 inch) spherical catalyst particles in the annular space between the outer container and the pipewall. The experimental contraction runs involved moving the outer cylindrical container upwards, such that the catalyst particles are driven up into the inner pipewall. This produced the desired relative effect of the inner screen growing down, or contracting, into the bed during a reactor cooldown. The displacement rate was varied to account for the rate of contraction as a variable in the cooling of a reactor.

In the experiments, the louvers 20 in the reactor create a pocket area 52 underneath the louvers 20. Beneath the pocket area 52, is a catalyst space 54 where catalyst particles have flowed around the louvers 20 and filled in. As the outer cylindrical container is moved upwards, relative to the pipewall, the catalyst particles in the catalyst space 54 are forced upwards into the pocket area 52. An alternate method of performing this experiment is to drive the inner pipewall downward relative to the outer container.

These experiments were performed on an inner pipewall for the flow of catalyst under the louvers on the inner pipewall. However, the same principle applies when an outer, or exterior, wall has a louvered construction. As the reactor cools and contracts, the outer wall will also contract at substantially the same rate as the inner pipewall, and catalyst will be forced up under the louvers during a cooldown period. The louvers for an exterior wall will preferably have the same angle and length, where the length is the distance from the louver's leading edge to its trailing edge, as louvers on an interior pipewall.

The data is supportive of the theory that the displacement of catalyst under the louvers in the present invention was stronger function of the extrusion mechanism rather than a volume displacement mechanism. The extrusion mechanism leads to the displacement of solid particles up under the louvers to a distance based upon the thermal differential for a respective class of reactors. The design is therefore to have a louver with a trailing edge that extends a distance sufficiently below the bottom edge of the opening to be greater than or equal to the expected thermal contraction of the reactor less the distance between the louver's trailing edge and the granular solid's angle of repose base.

This also allows for design without baffles on the louvers or the exterior wall. The use of baffles is to prevent solid particles rising up to the openings 12. The lack of baffles is an advantage for both flow distribution considerations and hydraulic considerations with the louver design concept.

While the invention has been described with what are presently considered the preferred embodiments, it is to be understood that the invention is not limited to the disclosed embodiments, but it is intended to cover various modifications of the plates, combinations of plates, and equivalent arrangements included within the scope of the appended claims.

The invention claimed is:

1. An apparatus for use in a reactor containing a granular solid in a cross flow system comprising:
   a perforated plate forming an exterior wall of the reactor and having openings defined therein, wherein the openings have an upper edge and a lower edge; and
   a plurality of louvers extending from an interior the perforated plate, wherein the louvers have a first edge and a second edge, where the first edge is a leading edge and the second edge is a trailing edge, and where the leading edge of the louver is affixed to the perforated plate, and where the trailing edge of the louver extends a distance below the lower edge of the openings equal to or greater than the maximum thermal contraction length of the reactor less the vertical distance from the trailing edge of the louver to the granular solid angle repose base.

2. The apparatus of claim 1 wherein the louvers extend inward from the perforated plate at an angle from vertical between 10 degrees and 40 degrees.

3. The apparatus of claim 2 wherein the louvers extend inward from the perforated plate at an angle from vertical between 10 degrees and 20 degrees.

4. The apparatus of claim 3 wherein the louvers extend inward from the perforated plate at an angle from vertical between 10 degrees and 15 degrees.

5. The apparatus of claim 1 wherein the louvers are layered such that the louvers overlap.

6. The apparatus of claim 1 wherein the trailing edge of the louvers extends at least 15.0 cm (5.9 inches) below the lower edge of the opening.

7. The apparatus of claim 1 wherein the trailing edge of the louvers extends at least 1.22 cm (0.48 inches) per meter of reactor height below the lower edge of the opening.

8. An exterior reactor wall comprising:
   a partition having openings defined therein, where each opening has a lower edge and an upper edge; and
   a plurality of inward facing louvers extending from an interior of the partition, wherein the louvers are positioned to be oriented such that the leading edge of the louvers is affixed above the upper edge of the opening and the trailing edge of the louvers extends a distance between about 15.0 cm (5.9 inches) and about 20 cm (7.9 inches) below the lower edge of the opening, and the louvers are disposed at an angle between 10° and 40° from the partition.

9. The exterior reactor wall of claim 8 wherein the louvers are disposed at an angle between 10° and 20° from the partition.

10. The exterior reactor wall of claim 8 wherein the partition is substantially cylindrical and the louvers circumscribe the interior side of the partition.

* * * * *